(12) United States Patent
Arrouye et al.

(10) Patent No.: US 6,532,472 B1
(45) Date of Patent: Mar. 11, 2003

(54) PERSISTENT STATE DATABASE FOR OPERATING SYSTEM SERVICES

(75) Inventors: Yan Arrouye, Cupertino, CA (US); Sean J. Findley, Gilroy, CA (US); Keith L. Mortensen, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/162,126
(22) Filed: Sep. 29, 1998
(51) Int. Cl.[7] .............................................. G06F 17/00
(52) U.S. Cl. .................................. 707/103 R; 707/103 Z
(58) Field of Search ........................ 707/1, 100–104, 707/200, 101, 103 R–103 Z; 709/318; 703/26; 345/335

(56) References Cited

U.S. PATENT DOCUMENTS

| | | | | |
|---|---|---|---|---|
| 4,805,134 A | * | 2/1989 | Calo et al. ..................... 707/10 |
| 5,652,876 A | * | 7/1997 | Ashe et al. ..................... 703/26 |
| 5,805,886 A | * | 9/1998 | Skarbo et al. .................. 709/318 |
| 5,835,089 A | * | 11/1998 | Skarbo et al. .................. 345/335 |
| 6,032,153 A | * | 2/2000 | Sadiq et al. .................... 707/103 |

* cited by examiner

Primary Examiner—Alford W. Kindred
(74) Attorney, Agent, or Firm—Burns, Doane, Swecker & Mathis, L.L.P.

(57) ABSTRACT

A database is used to store user interface state information. The database is accessed by a key having a service ID field, a caller ID field, and a caller context ID field. The caller context ID is used to identify the context in the application program from which the user interface is called. In this manner, the system can differentiate between calls from different portions of the application program which can have different user expectations of the desirable user interface state.

55 Claims, 5 Drawing Sheets

PERSISTENT STATE DATABASE FOR OPERATING SYSTEM SERVICES

RELATED APPLICATIONS

This application is related to the applications, Arrouye et al, U.S. patent application Ser. No. 09/161,758 for, "A METHOD ADAPTED TO TRANSPARENTLY TRANSFORM OBJECTS FOR AN APPLICATION PROGRAM," Arrouye et al, U.S. patent application Ser. No. 09/162,125 for, "A MULTI-REPOSITORY DISPLAY SYSTEM USING SEPARATE PRESENTATION, ADAPTATION AND ACCESS LAYERS", and Arrouye, et al, U.S. patent application Ser. No. 09/162,625 for, "METHOD AND APPARATUS FOR "JUST-IN-TIME" DYNAMIC LOADING AND UNLOADING OF COMPUTER SOFTWARE LIBRARIES", which are all incorporated herein by reference.

BACKGROUND OF THE INVENTION

1. Field of the Invention

The present invention generally relates to interaction with services provided by the operating system in a computer. More particularly, the present invention relates to a method and apparatus for storing information that identifies the state of a particular client's, or user's, interaction with operating system services.

2. State of the Art

A computer's operating system typically provides a variety of different services that are called upon by clients, e.g. application programs and other processes, to perform functions that may relate to hardware components of the computer system, or other software programs. For instance, the file system permits a client to retrieve files from a local hard disk drive to open them within an application program, as well as store them back on the disk drive when they are closed. Another example of an operating system service is a color picker, which enables a client to vary colors which are displayed on a computer monitor and/or printed on a printer.

Many operating system services require, or at least permit, a client to provide input which determines how the function of the service is to be carried out. For instance, when a file is to be opened in an application program, the client is provided with a choice of available storage locations, and files within that location, from which to select. Similarly, a color picker may provide sliders, or other types of control elements, which enable the user to adjust the colors on a display. These types of services typically have a user interface associated with them, via which the user can provide the necessary input. Other types of operating system services may not require explicit user input, and therefore normally do not have a corresponding user interface. For instance, the operating system may want to keep track of a user name and password for a server, to provide for automatic reconnection.

One example of a user interface that is provided when an application program issues a call to open or save files comprises a visual display of a directory and its contents. The user selects a file to be operated on by the application program, by clicking on a representation of the file in the visual display of the user interface. Typically, information concerning the directory displayed in the user interface is stored when the access to the operating system service terminates, e.g. the user exits the user interface. The next time the application program calls that service, the operating system causes the user interface to display the most-recently stored directory.

There are many operating system services which are called by multiple different clients. For instance, the file system service may be called by a text editing portion of a word processor, and then called by the dictionary portion of the same word processor, or by an entirely different application program. When the text portion of the word processor calls the file system again, its user interface will display the contents of the last directory that had been accessed. Thus, if the most recent call to the file system was from the dictionary portion of the word processor, the user interface might display a list of dictionary files. The user must then manipulate the user interface so that it displays the directory containing the desired text files. This can be a time-consuming annoyance to the user.

Additionally, when a desired directory is displayed to the user, the display typically occurs at a default location in the directory. For example, if files are displayed in alphabetical order, the files which initially appear are those whose names begin with A, B, C, etc. Consequently, a user may have to scroll down the user interface to find a previously selected object. If a directory contains a long list of files this can take some time.

It is desired to provide an improved method and apparatus for storing state information relating to operating system services across invocations of the services, to ensure correct operation of services, as well as to make the access to such services more convenient for the client.

SUMMARY OF THE PRESENT INVENTION

The present invention generally relates to a method and system for storing state information relating to shared service programs. A database stores information which preserves the state of a particular operating system service for each client which calls that service. Thus, whenever a client accesses the service, it will be returned to the same state that existed when it last exited that service, even if other clients had accessed the service in the meantime and left it in a different state. The stored information is external to the clients which utilize the services, so that changes to the services can be implemented without affecting the clients.

In a preferred embodiment of the invention, the state information which is stored for each client-service pair includes as much information as possible which relates to the client's interaction with that service. For example, the state of a file system service might include the directory which was last accessed by the client, together with various parameters that define the user interface for that service, such as the size and location of a dialog window. Additional information along these lines can include position of a scroll button for the window, so that the client is returned to the same position in the directory where it exited the previous time, rather than a default position such as the top of a list.

The state information is stored under the control of the shared service or the operating system, rather than the application program. The application program need not be modified to provide changes to the state information storing process. The application program, however, can provide context information to affect the storing of the state information indirectly.

Preferably, the database is accessed by a key. The key includes a caller ID field indicating the application program or other client, a service ID field indicating the shared service program and a caller context ID field which may contain context information provided by the client.

The caller context ID field in the key allows different states to be stored for different contexts in an application.

For example, the same service could be called by the text editing portion of a word processor, and the dictionary portion of the word processor. When the text portion of the word processor calls the service, the user interface will be set up with the state information corresponding to the state of the service which existed the last time the text portion of the word processor called the service. This avoids the annoyance of the user interface showing a directory of dictionary files when one wants to open a text file. The use of the caller context ID field allows two or more different states to be stored; one for each context of the application program.

In a preferred embodiment of the present invention, the key to the database also has a service context ID field. The service context ID field allows different versions of the shared service program to store different types of state data. A first version of a shared service interface might store the user interface state information in a certain manner. An upgrade to the shared service program can modify the way state information is stored. However, entries to the database may have already been made using the first version of the shared service program. The service context ID allows the upgraded shared service program to determine how the state data is stored in the database; the old way or the new way.

BRIEF DESCRIPTION OF THE DRAWINGS

The present invention can be further understood from the following description in conjunction with the appended drawings. In the drawings.

DETAILED DESCRIPTION OF THE PREFERRED EMBODIMENT

Figure 1:
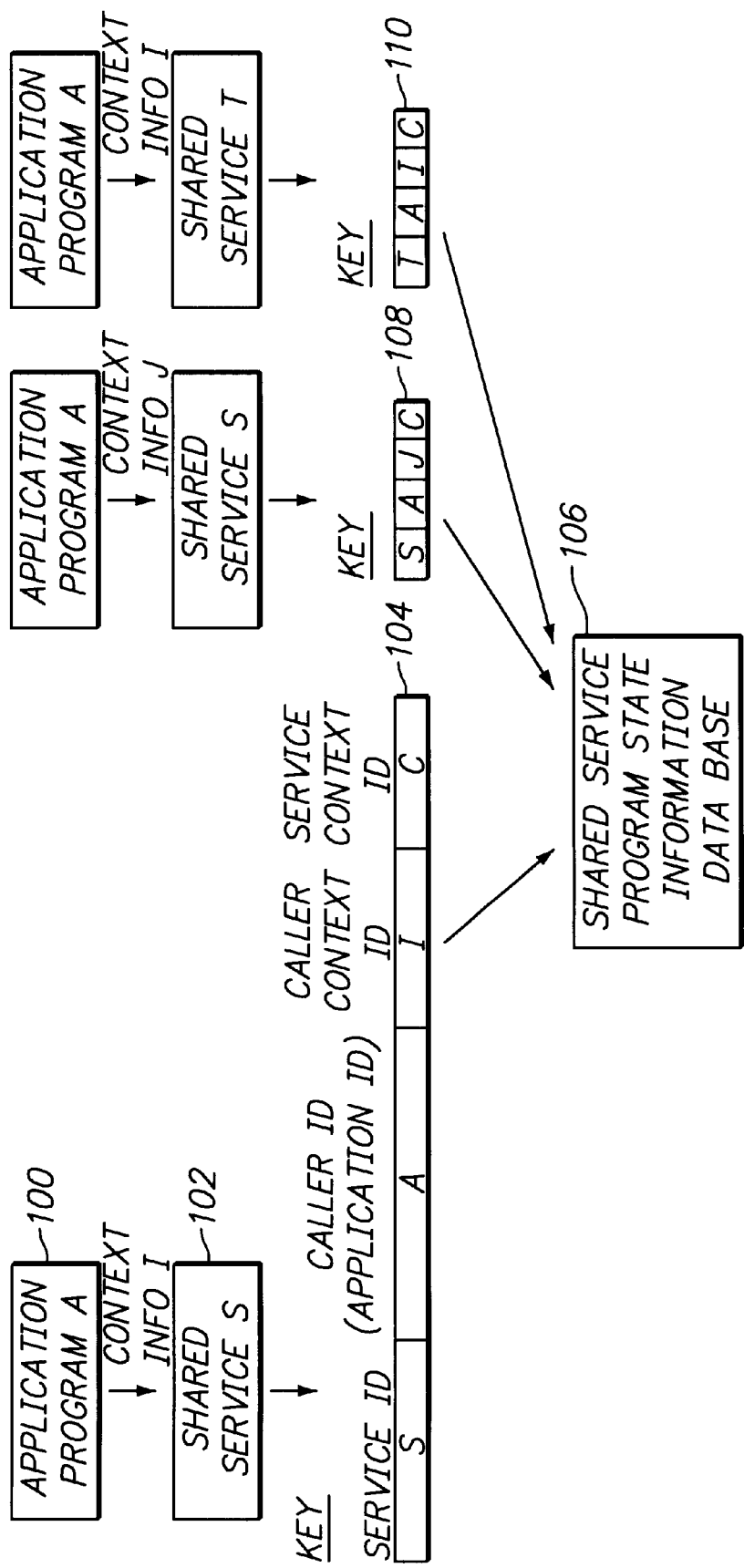
FIG. 1 is a general block diagram showing the principles of the present invention.

FIG. 1 is a diagram that illustrates the general concepts which underlie the present invention. Block 100 shows an application program A. The application program A calls a shared service program S in block 102. The shared service program S can be any one of a variety of programs that are called by one or more application programs. These shared service programs can include user interfaces, printer software or procedures in an application programing interface. The application program A can send context information I to the shared service program. The shared service or operating system produces a Key 104 to access and store state information of the shared service program in a database 106. In a preferred embodiment, the key includes a service ID field to identify the shared service program, a caller ID field to identify the application program and a caller context ID field for any caller context information received from the application program. The Key 104 in a preferred embodiment also includes a service context ID produced by the shared service program.

Looking again at FIG. 1, when the application program A provides context information J to shared service program S, the resulting Key 108 will be different from Key 104. This means that the stored state information will be different for different contexts of the application program. Additionally, both a shared service program T and the shared service program S can use the same database without conflict since the Key 110 produced by shared service program T will be different from any key produced by shared service program S.

The Database 106 stores the state information for the shared service program. For example, a user interface can store positioning and display information and a printer program can store printer setups. This state information is stored under the control of the shared service program or operating system; the application program is not required to store the state information itself.

By sending the context information, the application program is given some ability to determine what state information is associated with different application contexts.

Since the application program does not control the storing of the state information, the information to be stored can be modified without requiring modifications to the application program. This process is aided by use of the service context ID field. A new version of the shared service program can change the service context ID, allowing the data structure of the stored state information to be modified without conflicts.

Figure 2:
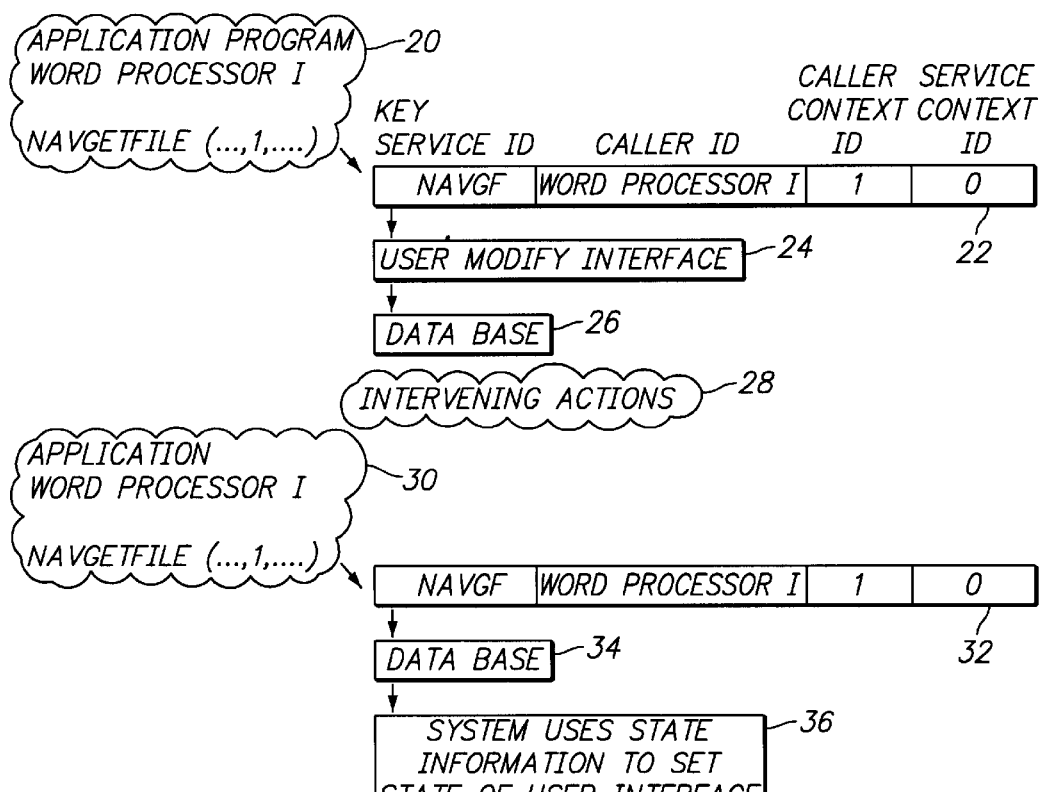
FIG. 2 is a diagram illustrating the operation of the method of the present invention using the example of a user interface.

FIG. 2 is a diagram illustrating a method of the present invention for use with a file system service. In block 20, an application program, such as a word processor, calls a "NavGetFile" routine, which is used to open a file within the application. The data sent in this call to the application programming interface for the service includes caller context information. In this example, the caller context information is set to 1. This indicates a first context of the application program. The application program can have as many, or as few, contexts as desired. In a preferred embodiment, context of 0 indicates that the application program is not distinguishing contexts.

The application programming interface for the service constructs a key. This key has a service ID field, a caller ID field, a caller context ID field, and preferably a service context ID field. The service ID indicates the particular service being called. Each shared service program has a different service ID number. The caller ID number identifies the application program calling the service. The caller context ID field contains the caller context, in this case 1, that is passed from the application program. The service context ID field contains the service context provided by the application programming interface. In this example, the service context ID is set to 0.

The key is used to determine whether there is any relevant user interface information stored in the database. If there is no state information currently stored in the database, the state of the service is set to a general default setting, or to a default setting for a given application program. Thus, for example, a dialog window for a "GetFile" user interface is displayed at a default size and location, and the contents of a predetermined directory are listed.

In block 24, the user modifies the state of the service and exits. Typically, the user will manipulate the interface to find the desired directory, select certain items, and/or change the size or position of the user interface window. In block 26, the key 22 is used to store the state information in the database. In block 28, intervening actions occur., Later, in block 30, the application program calls the same user interface as above. In block 32, the key 32, which is the same as the key 22, is produced. This key is used to access the database in block 34, and this will pull up the stored state information. In block 36, the system uses the stored state information to set the state of the called service to the same state that existed when that client exited the service the last time. This can be done even though intervening actions may include calling of the service from a second context of the application program, and modification of the state of the service in that second context.

Figure 3:
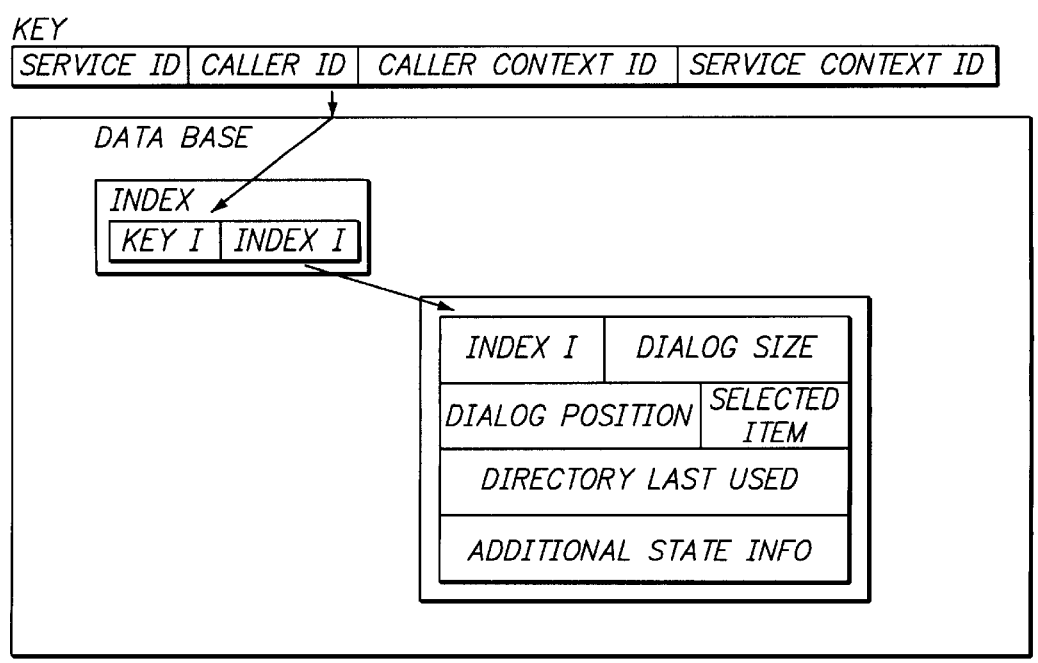
FIG. 3 is a diagram illustrating the use of the key to obtain user interface state information from the database.

FIG. 3 is a diagram illustrating the use of the key to obtain the database information. In this example, the key is sent to a database which stores the state information. In one embodiment, the key points to an index of another portion of the database. This index is used to obtain the user interface state information. In one embodiment, the database is implemented as a B*tree database. The B*tree database is a database resident on Apple® Macintosh® computers, and is described in chapter 19, volume 4 of Inside Macintosh, Addison-Wesley Publishing Company.

In the example shown in FIG. 3, the stored state information includes dialog window size, dialog window position, selected item information, directory last used, and an additional state information field. The additional state information field can be used to store any other file access information which is considered useful, such as filtering information and the like.

As discussed above, the service context ID portion of the key can be used to indicate the arrangement of the state information in the database. Different service IDs can indicate different arrangements of the state information fields.

Figure 4:
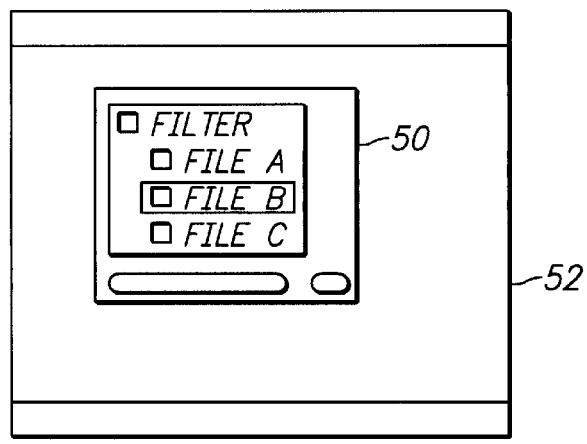
FIG. 4 is a diagram illustrating the position of a user interface on a computer screen.

FIG. 4 is a diagram that illustrates a user interface 50, in this case a dialog box, shown on the computer screen 52. The stored information can include the position of the dialog box 50 on the computer screen 52; the size of the dialog box 50; a directory, in this case the directory entitled "Folder"; and a selected item, in this case the file entitled "File B".

Figures 5A, 5B:
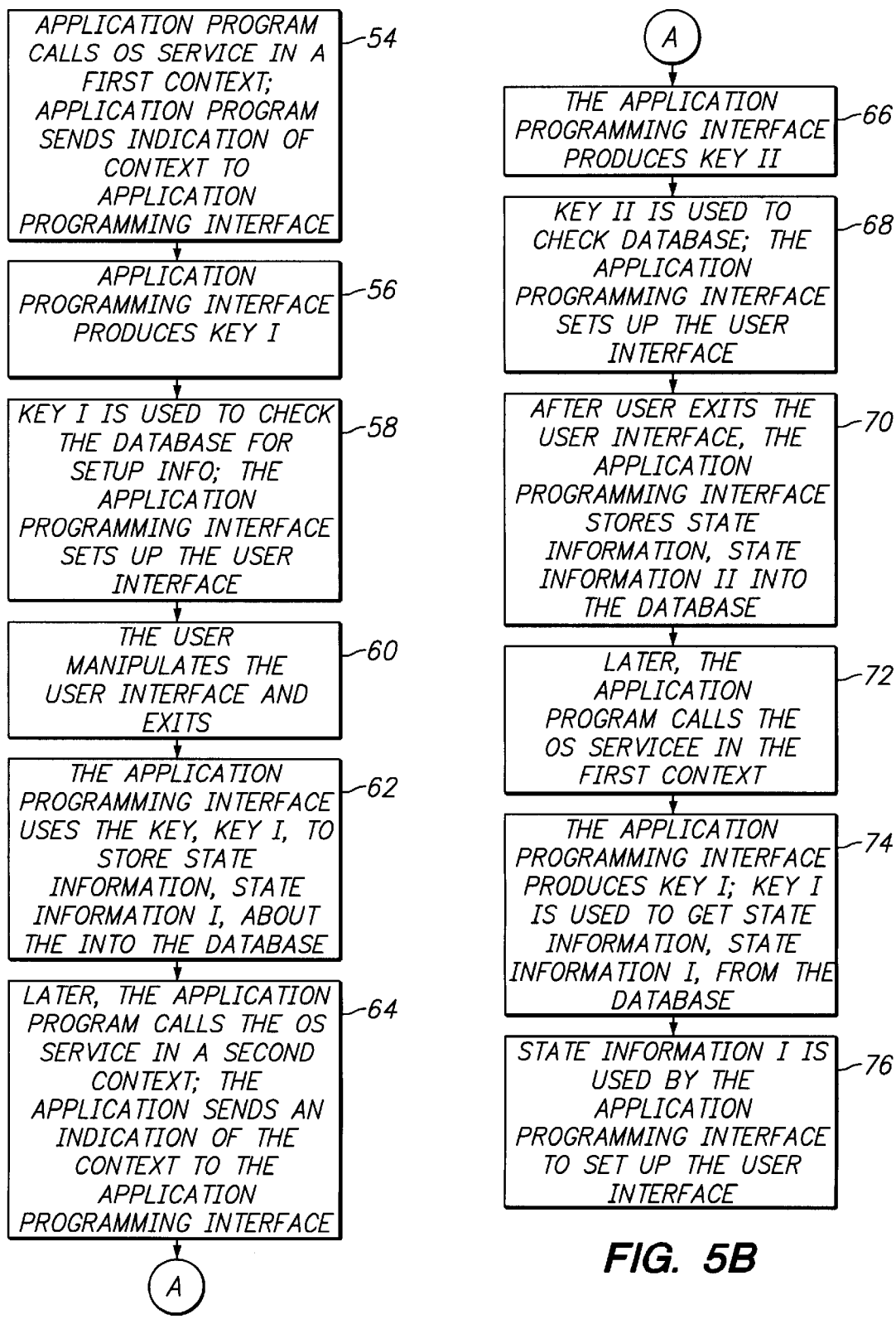
FIGS. 5A and 5B are flow charts illustrating the method of the present invention.

FIGS. 5A and 5B are flow charts illustrating a method of the present invention. In step 54, an application program calls an operating system service in a first context. The application program sends an indication of the context to the application programming interface. In step 56, the application programming interface produces a key, key I. In a preferred embodiment, the key is arranged to include the service ID field, the caller ID field, and the caller context ID field, as discussed above. In step 58, the key I is used to check the database for setup information. The application programming interface then sets the state for the called service. If no state information is stored in the database for a given key, the application programming interface can use a general default user interface preference, or a default user interface preference for a given application program. Alternately, the system could produce keys to check if any stored information corresponding to the service identification and/or caller ID is in the database, and set up the user interface using this data.

In step 60, the user manipulates the service to obtain the desired operation, and exits. In step 62, the application programming interface uses the key, I, to store state information I about the service in the database. In step 64, the application program calls the service in a second context. This second context might be different from the first context. The application program sends an indication of the context to the application programming interface. Looking at FIG. 5B, in step 66, the application programming interface produces a key, key II. Key II is different from key I, because the context ID field is different. In step 68, the key II is used to check the database. The application programming interface will then set the service to the appropriate state associated with that context. After the user exits the service, the application programming interface stores the state information, state information II, into the database. In step 72, the application programming interface calls the service in the first context. In step 74, the application programming interface produces the same key, key I, as discussed above. The key I is used to get state information I, which has been stored in the database. In step 76, the state information I is used by the application programming interface to set up the state of the service. In this way, the state of the service will be similar to the state that existed after step 60. Thus, if a user calls the file system to open a file in the text portion of an application program, later calls the file system from a dictionary to get a dictionary file, and then reopens the user interface back in the text portion of the application program, the system will display files in the first directory, rather than the directory of dictionaries.

Figure 6:
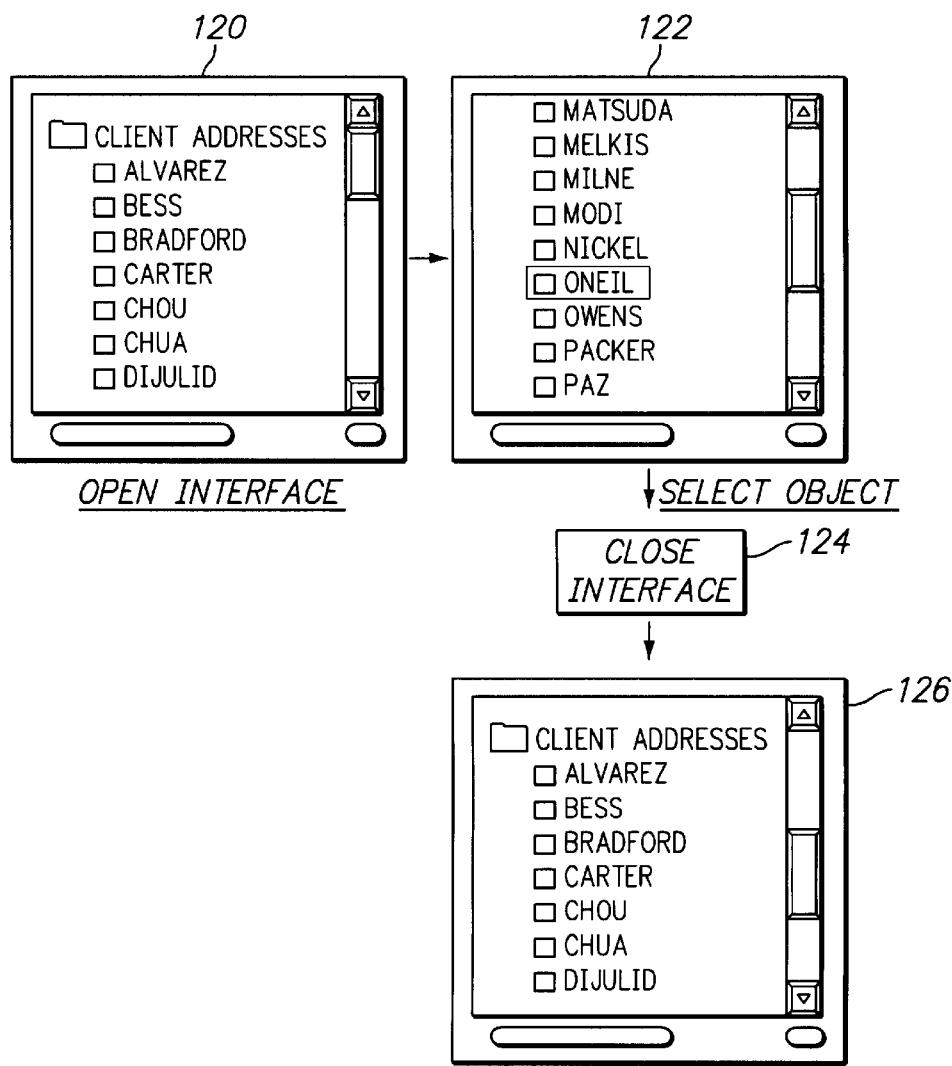
FIG. 6 is a diagram that shows a prior art method of displaying a user interface.

One aspect of the present invention concerns the storing of "selected item" information for a user interface. FIG. 6 is a diagram that illustrates a prior art method. In block 120, a user interface for the file system service displays the directory "Client Addresses". In block 122, the user manipulates the user interface to select the file "ONEIL". In block 124, the user interface is closed. In block 126, when the user interface is reopened, the directory "Client Address" is displayed but the previously selected file "ONEIL" is not displayed. The files at the top of the list, "ALVAREZ"—"DIJULIO", are displayed instead. This can be an inconvenience to the user. For example, consider the case where the user wants to modify the address files to reflect a telephone area code change. After modifying the file "ONEIL" the next time the user interface is opened, the user must scroll down the user interface to get to the next file to examine, "OWENS". By the end of the process, a substantial amount of time has been wasted manipulating the user interface.

Figure 7:
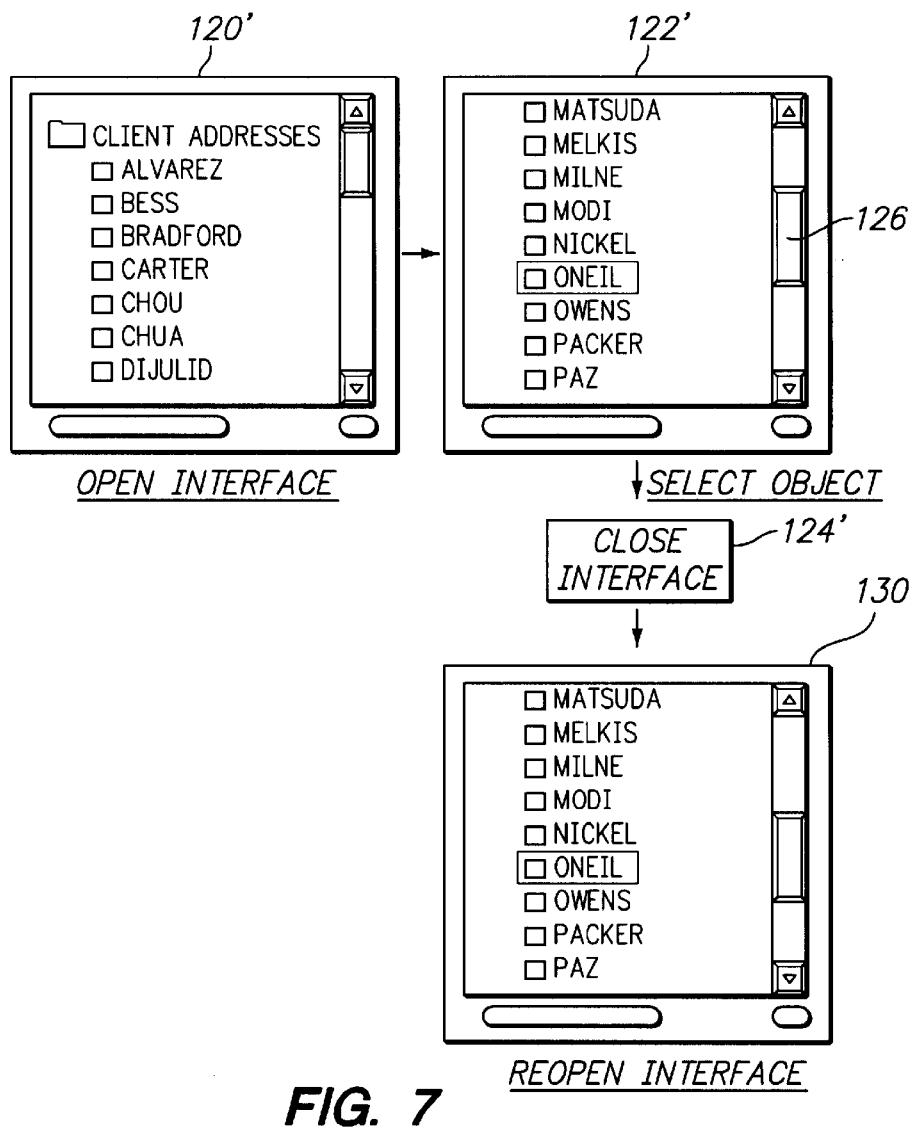
FIG. 7 is a diagram that shows a method of the present invention displaying a user interface.

FIG. 7 is a diagram illustrating the method of the present invention. In the present invention, when the interface is closed in step 124', the selected item "ONEIL" is stored in the database as shown in FIG. 2. Alternatively, or in addition, the position of a scroll button 126 in the user interface window can be stored. Looking again at FIG. 7, in block 130, when the service is recalled, the interface will display the selected item "ONEIL". If the user wants to open the next file, "OWENS", it can be easily accomplished.

In a preferred embodiment, the system can store more than one selected item. It is possible that the files have been modified such that some, or all, of the selected item(s) no longer exist. The display will then show only the previously selected files, if any, that still exist.

Figure 8:
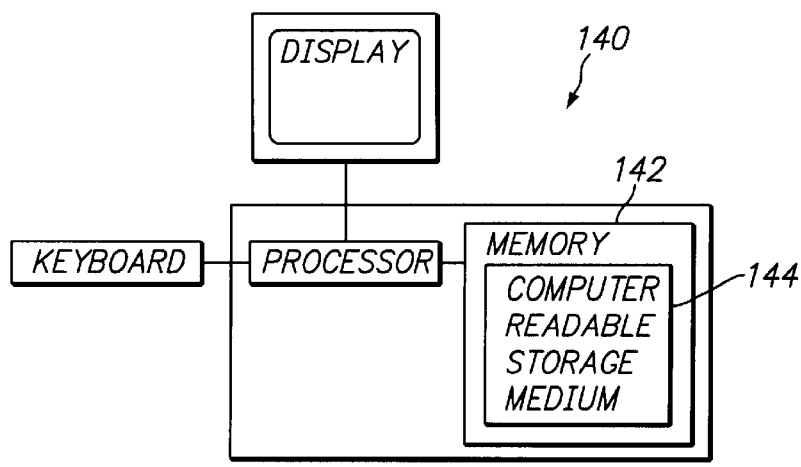
FIG. 8 is a diagram of a computer system with a computer readable medium suitable for storing the programs of the present invention.

FIG. 8 is a diagram that shows a computer system 140 including a memory 142 with access to the computer readable medium 144 containing a program to run the methods of the present invention. The computer readable medium can be Read Only Memory, Random Access Memory, Compact Disc, diskette or any other type of medium from which the programs of the present invention can be read.

It will be appreciated by those of ordinary skill in the art that the invention can be embodied in other specific forms without departing from the spirit or essential character thereof. For example, a "save file" interface may use stored user interface data from an "open file" interface for the same application program and application context.

The presently disclosed embodiments are therefore considered in all respects to be illustrative, and not restrictive. The scope of the invention is indicated by the appended claims, rather than the foregoing description, and all changes that come within the meaning and range of equivalence thereof, are intended to be embraced herein.

What is claimed is:

1. A method comprising:
    calling a shared service program from an application program, the application program providing context information to the shared service program;
    accessing stored state information of the shared service program using a key comprising a number of data fields including a service ID field identifying the shared service program, a caller ID field identifying the application program, and a caller context ID field containing the context information provided by the application program; and
    using the stored state information in the database to set the state of the shared service program.

2. The method of claim 1, wherein the shared service program comprises a user interface.

3. The method of claim 2, wherein the stored state information includes information about any selected items of the user interface.

4. The method of claim 1, wherein the key further includes a service context ID field.

5. The method of claim 4, wherein the service context ID field stores data related to the version of the shared service program.

6. The method of claim 1, wherein the key is a pointer to an index of the database structure.

7. A computer-readable medium containing a program which executes the following procedure:
    as a result of a call of a shared service program from an application program, producing a key comprising a number of data fields including a service ID field identifying the shared service program, a caller ID field identifying the application program, and a caller context ID field containing context information provided by the application program;
    accessing stored state information for the shared service program using a key comprising a number of data fields including a service ID field identifying the shared service program, a caller ID field identifying the application program, and a caller context ID field containing the context information provided by the application program; and
    using the stored state information in the database to set the state of the shared service program.

8. The computer-readable medium of claim 7, wherein the key is a pointer to an index of the database structure.

9. The computer-readable medium of claim 7, wherein the key further includes a service context ID field.

10. The computer-readable medium of claim 7, wherein the shared service program comprises a user interface.

11. The computer-readable medium of claim 10, wherein the stored state information includes information about any selected items of the user interface.

12. A method comprising:
    opening an user interface in a first context of an application program;
    manipulating the user interface;
    upon exiting the user interface, storing information concerning the state of the user interface;
    thereafter, opening the user interface in a second context of the application program, wherein the second context is different from the first context;
    manipulating the user interface in a different fashion than in the first manipulating step;
    exiting the user interface; and
    thereafter, opening the user interface in the first context of the application program, wherein the system uses the stored information to set the state of the user interface similar to the state of the user interface before the first exiting step.

13. The method of claim 12, wherein the storing step includes using a key comprising a number of data fields including an service ID field, a caller ID field, and a caller context ID field, wherein state information is stored in a database based on this key.

14. The method of claim 12, wherein the stored state information includes information about any selected items.

15. The method of claim 12, wherein the storing step is under the control of an application programming interface.

16. The method of claim 12, wherein the user interface is called by an application program.

17. A computer-readable medium containing a program which executes the following procedure:
    upon opening a user interface in a first context of an application program and exiting the user interface, storing state information concerning the state of the user interface; and
    thereafter, even when the user interface has been opened, manipulated and exited in a second context of the application program, upon re-opening the user interface in the first context of the application program, using the stored state information to set the state of the user interface similar to the state of the user interface before the storing step.

18. The computer-readable medium of claim 17, wherein state information is stored in a database based on a key, the key comprising a number of data fields including an service ID field, a caller ID field, and a caller context ID field.

19. A method comprising:
    opening an user interface;
    selecting at least one object from user interface;
    upon exiting the user interface, storing information about the state of the user interface wherein the stored information includes an indication of the at least one selected object; and
    thereafter, opening the user interface a second time using the stored state information in the database to set the state of the user interface, wherein the user interface displays a representation of the at least one selected object.

20. The method of claim 19, wherein the state information is stored in a database using a key comprising a number of data fields including a service ID field, a caller ID field, and a caller context ID field.

21. The method of claim 20, wherein the key further includes a service context ID field.

22. The method of claim 21, wherein the service context ID field stores data related to the version of an application programming interface.

23. The method of claim 19, wherein the stored state information further includes user interface size.

24. The method of claim 19, wherein the stored state information further includes user interface position.

25. The method of claim 19, wherein the stored state information further includes the last used directory.

26. A computer-readable medium containing a program which executes the following procedure:
   upon exiting a user interface from which at least one object is selected, storing information about the state of the user interface, the stored state information including an indication of the at least one selected object; and
   upon opening the user interface a second time, using the stored state information in the database to set the state of the user interface, wherein the user interface displays a representation of the at least one selected object.

27. The computer-readable medium of claim 26, wherein the state information is stored in database using a key comprising a number of data fields including a service ID field, a caller ID field, and a caller context ID field.

28. The computer-readable medium of claim 27, wherein the key further includes a service context ID field.

29. The computer-readable medium of claim 28, wherein the service context ID field stores data related to the version of an application programming interface.

30. The computer-readable medium of claim 26, wherein the stored state information further includes user interface size.

31. The computer-readable medium of claim 26, wherein the stored state information further includes user interface position.

32. The computer-readable medium of claim 26, wherein the stored state information further includes the last used directory.

33. A method comprising:
   maintaining a persistent state database containing shared-service state information for application programs, the persistent state database storing shared-service state information for different contexts of one of the application programs;
   obtaining state information from the persistent state-database for the one context of one of the application programs; and
   using the state information to set up the state of a shared service program for the one of the application programs.

34. The method of claim 33, wherein state information is stored in the database upon closing a shared service program.

35. The method of claim 33, wherein state information is obtained from the database upon opening a shared service program.

36. The method of claim 33, wherein a key is used to access the persistent state database, the key comprising a number of data fields including a caller ID field identifying the application program, and a caller context ID field.

37. The method of claim 36, wherein the key further comprises a service ID field identifying the shared service program.

38. The method of claim 33, wherein the shared service program comprises a user interface.

39. A computer-readable medium containing a program which executes the following procedure:
   maintaining a persistent state database containing shared-service state information for application programs, the persistent state database storing shared-service state information for different contexts of one of the application programs;
   obtaining state information from the persistent state database for the one context of one of the application programs; and
   using the state information to set up the state of a shared service program for the one of the application programs.

40. A system comprising:
   a persistent state database containing shared-service state information for application programs, the persistent state database storing shared-service state information for different contexts of one of the application programs;
   means for obtaining state information from the persistent state database for one context of the one of the application programs; and
   means for using the state information to set up the state of a shared service program for the one of the application programs.

41. A system comprising:
   a persistent state database containing shared-service state information for application programs, the persistent state database storing shared-service state information for different contexts of one of the application programs; and
   a shared service program adapted to use the state information for one context of the one of the application programs from the database to set up its state for the one of the application programs.

42. A method comprising:
   maintaining a persistent state database containing shared-service state information for application programs, the persistent state database storing state information that differs based on the application program and context within a given application program, the database containing state information for more than one context of one of the application programs;
   obtaining state information from the persistent state database for one context of the one of the application programs; and
   using the state information to set up the state of a shared service program for the one of the application programs.

43. A computer-readable medium containing a program which executes the following procedure:
   maintaining a persistent state database containing shared-service state information for application programs, the persistent state database storing state information that differs based on the application program and context within a given application program, the database containing state information for more than one context of one of the application programs;
   obtaining state information from the persistent state database for one context of the one of the application programs; and
   using the state information to set up the state of a shared service program for the one of the application programs.

44. A system comprising:
   a persistent state database containing shared-service state information for application programs, the persistent state database storing state information that differs based on the application program and context within a given application program, the database containing state information for more than one context of one of the application programs;
   means for obtaining state information from the persistent state database for one context of the one of the application programs; and means for using the state information to set up the state of a shared service program for the one of the application programs.

45. A system comprising:

a persistent state database containing shared-service state information for application programs, the persistent state database storing state information that differs based on the application program and context within a given application program, the database containing state information for more than one context of one of the application programs; and a shared service program adapted to use the state information for one context of the one of the application programs from the database to set up its state for the one of the application programs.

46. A method comprising:

maintaining a persistent state database containing shared-service state information for application programs, the persistent state database storing shared-service state information for different contexts of one of the application programs, the state information including dialog box position information, or dialog box size information or dialog display directory information;

obtaining state information from the persistent state database for one context of the one of the application programs; and using the state information to set up the state of a shared service program for the one of the application programs.

47. A computer-readable medium containing a program which executes the following procedure:

maintaining a persistent state database containing shared-service state information for application programs, the persistent state database storing shared-service state information for different contexts of one of the application programs, the state information including dialog box position information, or dialog box size information or dialog display directory information;

obtaining state information from the persistent state database for one context of the one of the application programs; and using the state information to set up the state of a shared service program for the one of the application programs.

48. A system comprising:

a persistent state database containing shared-service state information for application programs, the persistent state database storing shared-service state information for different contexts of one of the application programs, the state information including dialog box position information, or dialog box size information or dialog display directory information;

means for obtaining state information from the persistent state database for one context of the one of the application programs; and means for using the state information to set up the state of a shared service program for the one of the application programs.

49. A system comprising:

a persistent state database containing shared-service state information for application programs, the persistent state database storing shared-service state information for different contexts of one of the application programs, the state information including dialog box position information, or dialog box size information or dialog display directory information; and a shared service program adapted to use the state information for one context of the one of the application programs from the database to set up its state for the one of the application programs.

50. A system comprising:

means for producing a key comprising a number of data fields including a service ID field identifying the shared service program, a caller ID field identifying the application program, and a caller context ID field containing context information provided by the application program, the key produced as a result of a call of a shared service program from an application program; and means for accessing stored state information for the shared service program using a key comprising a number of data fields including a service ID field identifying the shared service program, a caller ID field identifying the application program, and a caller context ID field containing the context information provided by the application program, wherein the state of the shared service program is set using the stored state information in the database.

51. A system comprising:

a database adapted to store state information for a shared service program, the state information being accessible by a key comprising a number of data fields including a service ID field identifying the shared service program, a caller ID field identifying the application program, and a caller context ID field containing context information provided by the application program, the key produced as a result of a call of a shared service program from an application program; and a shared service program adapted use a key comprising a number of data fields including a service ID field identifying the shared service program, a caller ID field identifying the application program, and a caller context ID field containing the context information provided by the application program to obtain stored state information from the database, wherein the state of the shared service program is set using the stored state information in the database.

52. A system comprising:

software adapted to store state information concerning a first state of the user interface upon exiting a user interface in a first context of an application program; and software adapted to later use the stored state information to set the state of the user interface similar to the first state upon re-opening the user interface in the first context of the application program, even when the user interface has been opened, manipulated into a second state and exited in a second context of the application program.

53. A system comprising:

means for storing state information concerning a first state of the user interface upon exiting a user interface in a first context of an application program; and means for later using the stored state information to set the state of the user interface similar to the first state upon re-opening the user interface in the first context of the application program, even when the user interface has been opened, manipulated into a second state and exited in a second context of the application program.

54. A system comprising:

means for storing information about the state of the user interface upon exiting the user interface from which at least one object is selected wherein the stored information includes an indication of the at least one selected object; and means for opening the user interface a second time using the stored state information in the database to set the state of the user interface, wherein the user interface displays a representation of the at least one selected object.

55. A system comprising:

software adapted to store information about the state of the user interface upon exiting the user interface from which at least one object is selected wherein the stored information includes an indication of the at least one selected object; and software adapted to open the user interface a second time using the stored state information in the database to set the state of the user interface, wherein the user interface displays a representation of the at least one selected object.

* * * * *